(12) United States Patent
Sakurai

(10) Patent No.: US 10,245,925 B2
(45) Date of Patent: Apr. 2, 2019

(54) VEHICLE DOOR STRUCTURE AND METHOD OF MANUFACTURING VEHICLE DOOR

(71) Applicant: TOYOTA JIDOSHA KABUSHIKI KAISHA, Toyota-shi, Aichi-ken (JP)

(72) Inventor: Tomohiro Sakurai, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 15/336,015

(22) Filed: Oct. 27, 2016

(65) Prior Publication Data

US 2017/0174052 A1    Jun. 22, 2017

(30) Foreign Application Priority Data

Dec. 21, 2015   (JP) .................. 2015-249004

(51) Int. Cl.
*B60J 5/04* (2006.01)
*B60J 1/17* (2006.01)
*E05F 5/00* (2017.01)
*E05F 5/06* (2006.01)

(52) U.S. Cl.
CPC .............. *B60J 5/0416* (2013.01); *B60J 1/17* (2013.01); *B60J 5/0413* (2013.01); *E05F 5/003* (2013.01); *E05F 5/06* (2013.01); *E05Y 2900/55* (2013.01)

(58) Field of Classification Search
CPC .............................. B60J 5/0416; B60J 5/0413
USPC .................................. 49/348, 349, 351, 352
See application file for complete search history.

(56) References Cited

U.S. PATENT DOCUMENTS

| | | | | | |
|---|---|---|---|---|---|
| 2,069,219 | A | * | 2/1937 | Conlon | B60J 1/17 49/377 |
| 2,848,272 | A | * | 8/1958 | Storch | B62D 25/12 16/86 A |
| 3,868,788 | A | * | 3/1975 | Podolan | E05F 11/445 49/349 |
| 4,241,542 | A | * | 12/1980 | Podolan | E05F 11/382 49/352 |

(Continued)

FOREIGN PATENT DOCUMENTS

JP    S50-1220 A    1/1975
JP    S63-140486 A    6/1988

(Continued)

OTHER PUBLICATIONS

Partial English Language Translation of JP50-001220A.

*Primary Examiner* — Marcus Menezes
(74) *Attorney, Agent, or Firm* — Oliff PLC

(57) ABSTRACT

A vehicle door structure has a door inner panel; a BL inner RF that is made of a fiber reinforced resin and that, together with the door inner panel, forms a closed cross-section structure portion; and an up-stop member that is structured to include joined portions that are joined to the BL inner RF, and a rubber stopper that is disposed further toward a vehicle transverse direction outer side than the closed cross-section structure portion. A communication hole, that communicates an interior and an exterior of the closed cross-section structure portion and through which the up-stop member is inserted, is formed in the BL inner RF. The joined portions are joined by rivets in a state of being superposed on the BL inner RF from a vehicle transverse direction inner side.

8 Claims, 9 Drawing Sheets

(56) References Cited

U.S. PATENT DOCUMENTS

| | | | | |
|---|---|---|---|---|
| 4,329,816 A * | 5/1982 | Koike | B60J 1/17 | 49/350 |
| 4,399,600 A * | 8/1983 | Draper | B60J 1/17 | 29/401.1 |
| 4,835,908 A * | 6/1989 | Londeck | B60J 1/17 | 16/82 |
| 5,054,238 A * | 10/1991 | Glossop, Jr. | B60J 1/17 | 49/211 |
| 5,948,499 A * | 9/1999 | Tsukada | B60J 10/75 | 428/90 |
| 6,381,906 B1 * | 5/2002 | Pacella | B60J 5/0416 | 296/146.5 |
| 6,571,515 B1 * | 6/2003 | Samways | B60J 5/0416 | 49/352 |
| 2003/0009948 A1 * | 1/2003 | Nishikawa | E05F 11/485 | 49/502 |
| 2006/0168892 A1 * | 8/2006 | Dohles | B60J 5/0426 | 49/374 |
| 2009/0165392 A1 * | 7/2009 | Totani | B60J 5/0401 | 49/502 |

FOREIGN PATENT DOCUMENTS

| | | |
|---|---|---|
| JP | H07-81405 A | 3/1995 |
| JP | 2008-105437 A | 5/2008 |
| JP | 2013-100025 A | 5/2013 |
| JP | 2015-147473 A | 8/2015 |

\* cited by examiner

VEHICLE DOOR STRUCTURE AND METHOD OF MANUFACTURING VEHICLE DOOR

CROSS-REFERENCE TO RELATED APPLICATION

This application is based upon and claims the benefit of priority of the prior Japanese Patent Application No. 2015-249004, filed on Dec. 21, 2015, the entire contents of which are incorporated herein by reference.

FIELD

The embodiments discussed herein are related to a vehicle door structure and a method of manufacturing a vehicle door.

BACKGROUND

In the vehicle door structure disclosed in Japanese Patent Application Laid-Open (JP-A) No. 7-81405, an up-stop member (a glass stopper) for limiting the range of raising of a door glass is provided at the interior of a door main body. This up-stop member is mounted to the vehicle transverse direction outer side of a reinforcing portion that is provided at the upper portion of a door inner panel.

In the vehicle door structure disclosed in above-described JP-A No. 7-81405, the up-stop member projects out toward the vehicle transverse direction outer side at the reinforcing portion. Therefore, in a case in which the door outer panel intrudes toward the vehicle transverse direction inner side at the time of a side collision, stress concentrates at the portion of the reinforcing portion at which portion the up-stop member is mounted. This configuration has not been particularly problematic since the member to which the up-stop member is mounted has been thin steel plate; however, in cases in which the member to which the up-stop member is mounted is made of a fiber reinforced resin (hereinafter called FRP), there is a possibility of problems occurring and a structure that suppresses concentration of stress is desired.

SUMMARY

In view of the above-described circumstances, the present invention is to provide a vehicle door structure and a method of manufacturing a vehicle door in which a concentration of stress arising at a member, that is made of FRP and to which an up-stop member is mounted, is suppressed even in a case in which load is inputted to the up-stop member due to a side collision.

A vehicle door structure of a first aspect has: a first panel; a second panel that is made of a fiber reinforced resin, that is provided at a vehicle transverse direction outer side of the first panel, and that, together with the first panel, forms a closed cross-section structure portion, whose length direction is a vehicle longitudinal direction, at an upper portion of a vehicle door; an up-stop member that is structured to include joined portions that are joined to the second panel, and an abutment portion that is disposed further toward a vehicle transverse direction outer side than the closed cross-section structure portion and that limits a range of raising of a door glass by abutting a glass-side member provided at a lower portion of the door glass; and rivets that join the second panel and the joined portions, wherein a communication hole, that communicates an interior and an exterior of the closed cross-section structure portion and through which the up-stop member is inserted, is formed in the second panel, and the joined portions are joined in a state of being superposed on the second panel from a vehicle transverse direction inner side.

In the vehicle door structure of the first aspect, the closed cross-section structure portion, whose length direction is the vehicle longitudinal direction, is formed at the vehicle door upper portion by the first panel and the second panel that is provided at the vehicle transverse direction outer side of the first panel. The upper portion of the vehicle door is thereby reinforced. Further, the weight of the vehicle door is lightened due to the second panel being made of a fiber reinforced resin (FRP).

The vehicle door structure has the up-stop member. The up-stop member is structured to include the joined portions that are joined to the second panel, and the abutment portion that is disposed further toward the vehicle transverse direction outer side than the closed cross-section structure portion. The range of raising of the door glass is limited due to the abutment portion abutting the glass-side member.

Moreover, the communication hole that communicates the interior and the exterior of the closed cross-section structure portion is formed in the second panel. The up-stop member is inserted-through this communication hole, and, in a state in which the joined portions of the up-stop member are superposed on the second panel from the vehicle transverse direction inner side, the joined portions are joined to the second panel by rivets.

Therefore, even in a case in which a large load that is directed toward the vehicle transverse direction inner side is inputted to the up-stop member at the time of a side collision, a concentration of stress arising at the second panel that is made of FRP can be suppressed due to the up-stop member separating from the second panel toward the vehicle transverse direction inner side due to the rivets breaking or being damaged or the like.

In a vehicle door structure of a second aspect, in the vehicle door structure of the first aspect, adhesion portions, that join the second panel and the up-stop member, are provided between the second panel and the up-stop member.

In the vehicle door structure of the second aspect, the adhesion portions that join the second panel and the up-stop member are provided between the second panel and the up-stop member. Namely, the joining of the second panel and the up-stop member is carried out not only by fastening by the rivets, but also by adhesion by an adhesive. Therefore, the load at which the up-stop member separates can be adjusted easily, and further, penetration of sound into the vehicle cabin can be suppressed.

In a vehicle door structure of a third aspect, in the vehicle door structure of the first aspect, the up-stop member has a bracket that is structured to include the joined portions, and an up-stop main body that is structured to include the abutment portion and that is fixed to the bracket, and the bracket and the up-stop main body are structured such that a relative fixed position of the up-stop main body with respect to the bracket can be adjusted.

In the vehicle door structure of the third aspect, the up-stop member has the bracket that is structured to include the joined portions, and the up-stop main body that is structured to include the abutment portion and that is fixed to the bracket. Moreover, the bracket and the up-stop main body are structured such that the relative fixed position of the up-stop main body with respect to the bracket can be adjusted. Therefore, the position of the abutment portion of the up-stop main body can be adjusted in a state in which the joined portions of the up-stop member and the second panel are joined as are by rivets.

In a vehicle door structure of a fourth aspect, in the vehicle door structure of the third aspect, a through-hole, through which a tool for adjusting the relative fixed position of the up-stop main body can be inserted, is formed in the first panel.

In the vehicle door structure of the fourth aspect, a through-hole, through which a tool for adjusting the relative fixed position of the up-stop main body can be inserted, is formed in the first panel. Therefore, adjustment of the position of the up-stop main body is easy.

In a vehicle door structure of a fifth aspect, in the vehicle door structure of the third aspect, a long hole, that is disposed along a raising/lowering direction of the door glass, is provided in the bracket, and the bracket and the up-stop main body are fastened and fixed together in a state in which a bolt is inserted-through the long hole.

In the vehicle door structure of the fifth aspect, the long hole, that is disposed along the raising/lowering direction of the door glass, is provided in the bracket, and the bracket and the up-stop main body are fastened and fixed together in a state in which a bolt is inserted-through the long hole. Due thereto, the relative fixed position of the up-stop main body with respect to the bracket can be adjusted by adjusting the position of the bolt with respect to the long hole of the bracket.

In a vehicle door structure of a sixth aspect, in the vehicle door structure of the first aspect, each rivet has a shaft portion that is inserted-through the second panel and the joined portion, a head portion that is disposed at one end side of the shaft portion, and a crimped portion at which another end side of the shaft portion is crimped.

In the vehicle door structure of the sixth aspect, the rivet has the shaft portion that is inserted-through the second panel and the joined portion, the head portion that is disposed at one end side of the shaft portion, and the crimped portion at which the other end side of the shaft portion is crimped. The second panel and the joined portions are joined by the rivets. Due thereto, in a case in which a large load that is directed toward the vehicle transverse direction inner side is inputted to the up-stop member at the time of a side collision, it is easy for the up-stop member to separate toward the vehicle transverse direction inner side due to the rivets breaking or being damaged or the like.

A method of manufacturing a vehicle door of a seventh aspect is a method of manufacturing a vehicle door that has the vehicle door structure of the first aspect, wherein joining by the rivets is carried out by vehicle transverse direction outer sides of the rivets being crimped.

In accordance with the method of manufacturing a vehicle door of the seventh aspect, it is easy to manufacture a vehicle door at which it is easy for an up-stop member to separate toward the vehicle transverse direction inner side in a case in which a large load, that is directed toward the vehicle transverse direction inner side, is inputted to the up-stop member at the time of a side collision.

In the vehicle door structure and the method of manufacturing a vehicle door relating to the present disclosure, even in a case in which load is inputted to an up-stop member due to a side collision, a concentration of stress arising at a member, that is made of FRP and to which the up-stop member is mounted, is suppressed.

DESCRIPTION OF EMBODIMENTS

A side door 10, that serves as a "vehicle door" and to which a vehicle door structure S relating to an embodiment of the present disclosure is applied, is described hereinafter by using the drawings.

Figure 6:
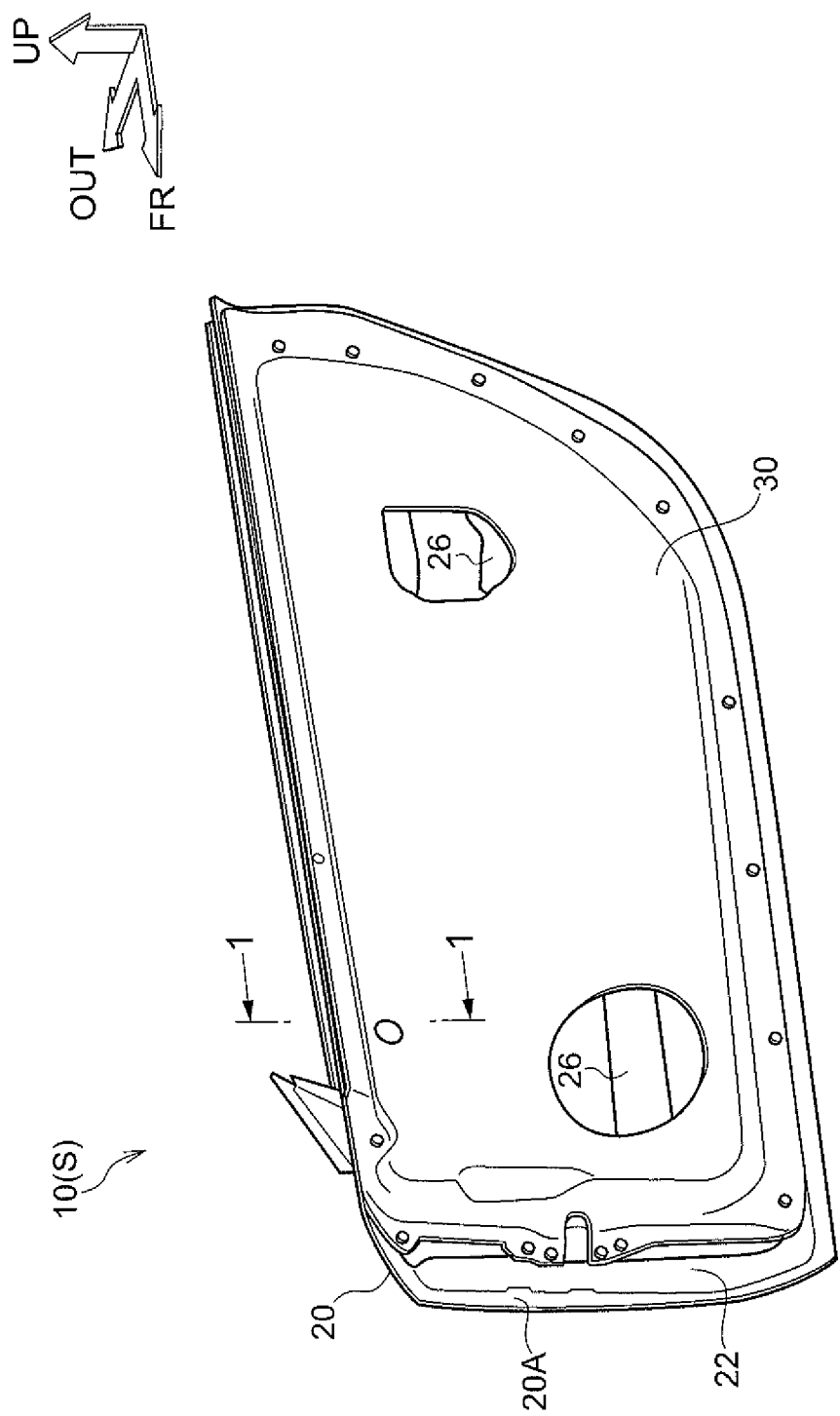
FIG. 6 is a perspective view showing the side door.
Figure 7:
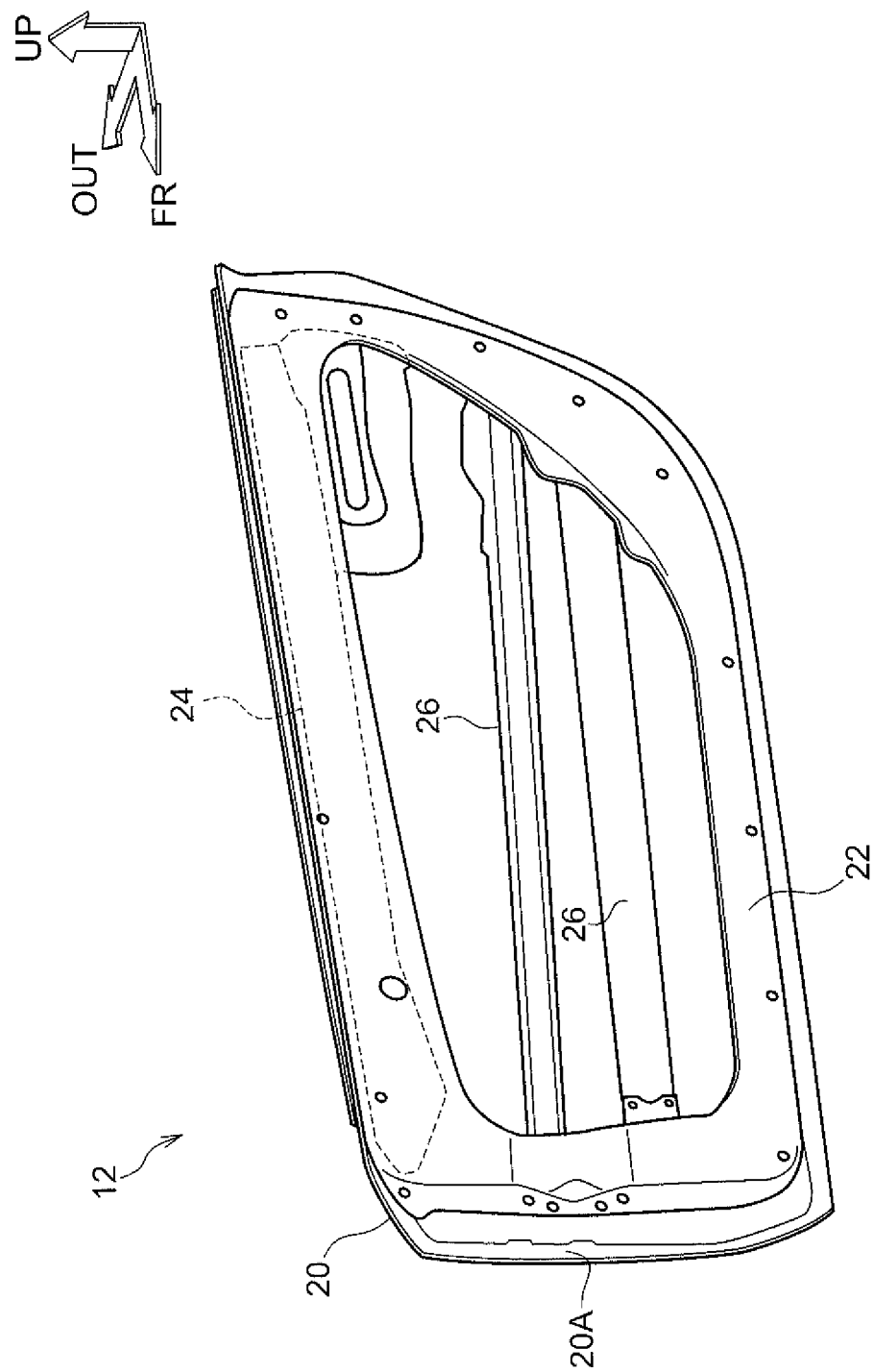
FIG. 7 is a perspective view showing a door outer assembly.
Figure 8:
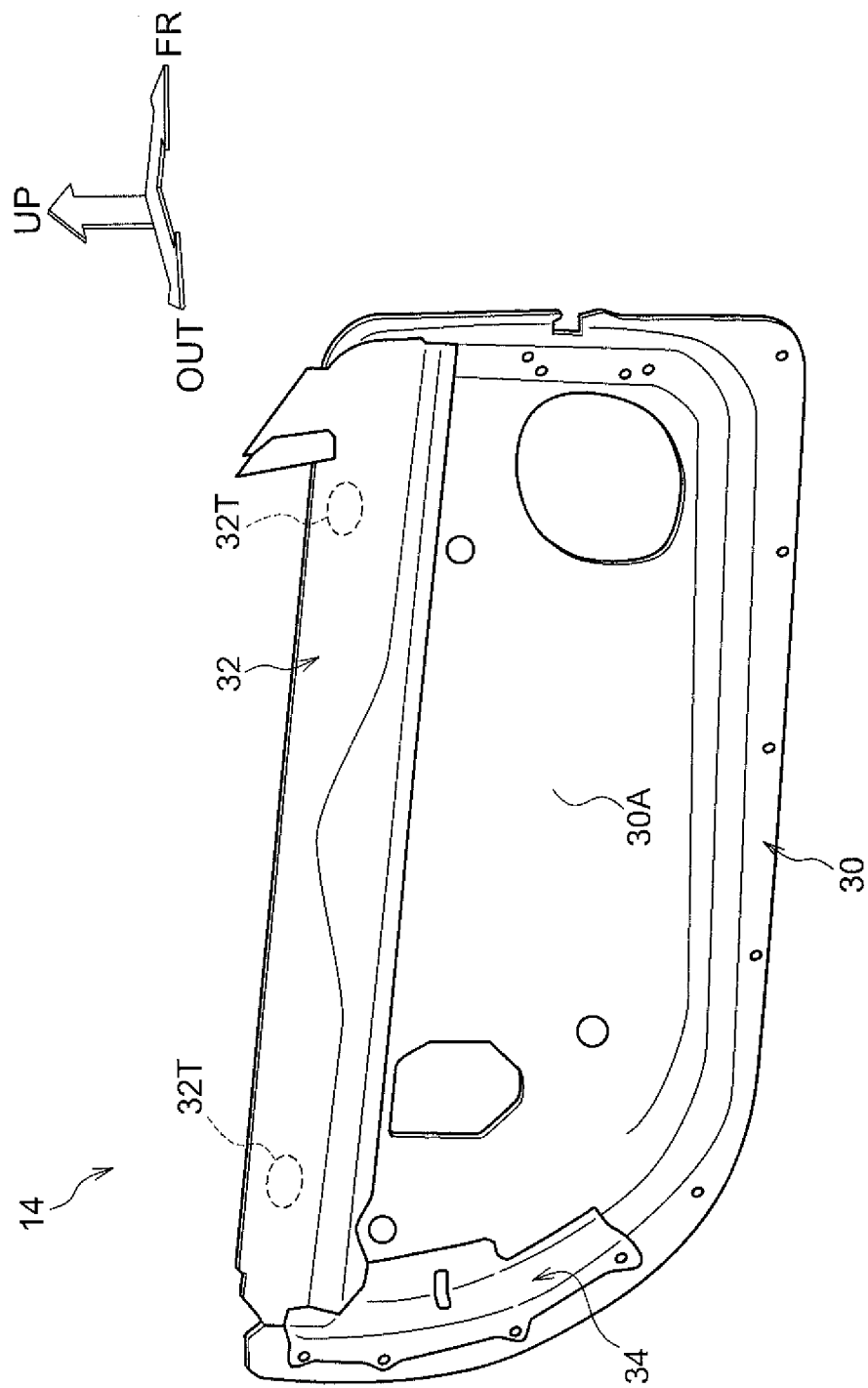
FIG. 8 is a perspective view showing a door inner assembly.

The side door 10 is shown in FIG. 6, a door outer assembly 12 is shown in FIG. 7, and a door inner assembly 14 is shown in FIG. 8. The side door 10 is structured to include the door outer assembly 12 and the door inner assembly 14. The side door 10 does not have, at the portion thereof further upward than the beltline, a sash that guides the door glass. Namely, the side door 10 is a sashless vehicle door. Further, a regulator (not shown) that performs the raising and lowering of a door glass 90 (see FIG. 1) is a cable-type regulator that raises and lowers the door glass 90 by driving a cable.

Figure 1:
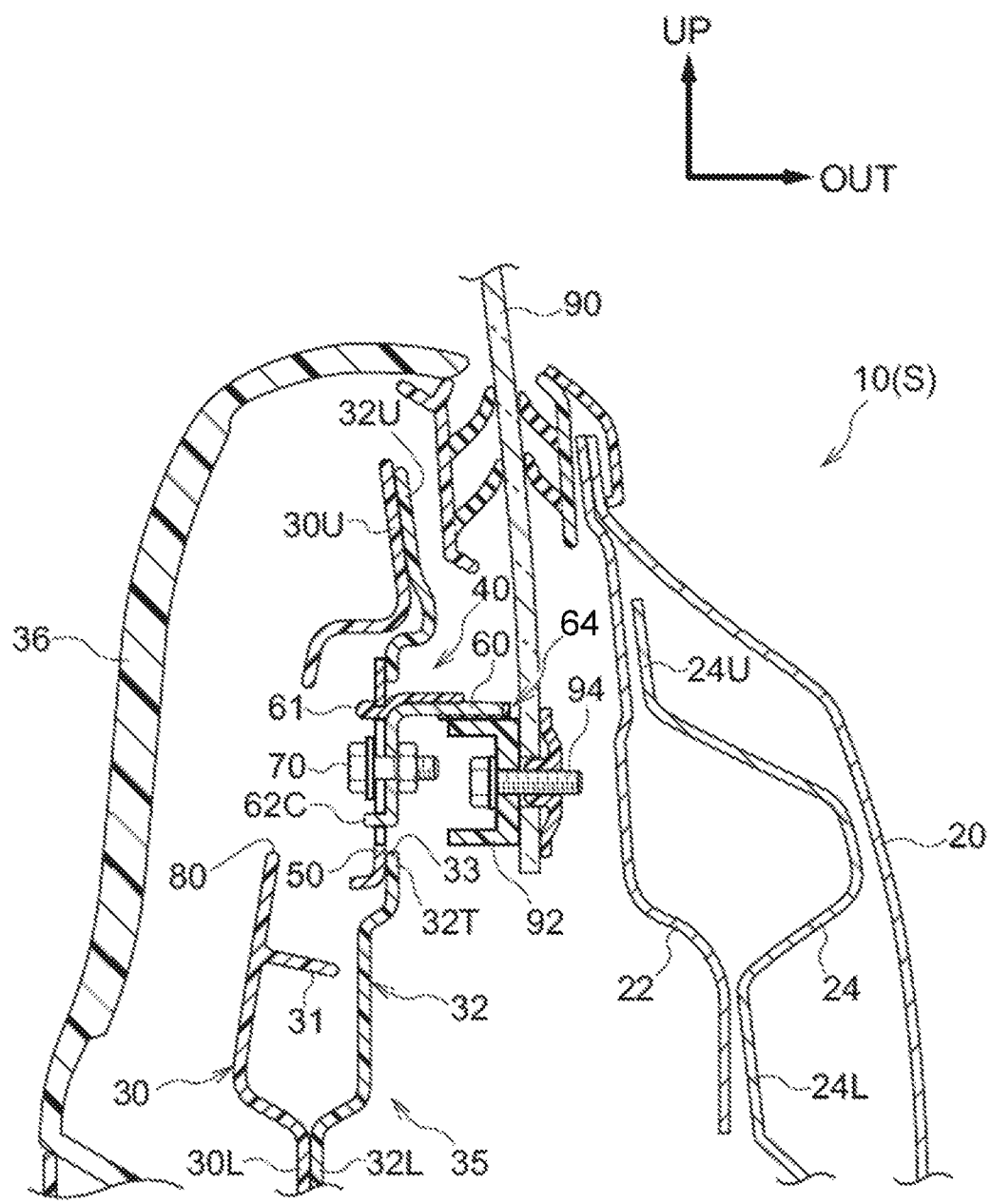
FIG. 1 is a cross-sectional view, corresponding to line 1-1 in FIG. 6, showing a state in which an upper portion of a side door, to which a vehicle door structure of a present embodiment is applied, is cut along a plane orthogonal to the vehicle longitudinal direction.

As shown in FIG. 7, the door outer assembly 12 is structured with the main portions thereof being a door outer panel 20 that is made of metal and structures the outer plate of the side door 10, an annular reinforcement (hereinafter abbreviated as "annular RF") 22, a beltline outer reinforcement (hereinafter abbreviated as "BL outer RF") 24, and various types of beams 26. The annular RF 22 is made of metal and formed in an annular shape, and is joined to an outer edge portion 20A of the door outer panel 20 by hemming. The BL outer RF 24 is joined to the upper portion of the annular RF 22. Concretely, as shown in FIG. 1, an upper side joining portion 24U and a lower side joining portion 24L of the BL outer RF 24 are joined to the annular RF 22. The front end portions and the rear end portions of the various types of beams 26 are joined to the annular RF 22 at the vertical direction intermediate portion of the side door 10.

As shown in FIG. 8, the door inner assembly 14 is structured to include a door inner panel 30 that is made of a carbon fiber reinforced resin (CFRP), a belt line inner reinforcement (hereinafter abbreviated as "BL inner RF") 32 that is made of CFRP and is joined to a surface 30A at the vehicle transverse direction inner side of the door inner panel 30, and a lock reinforcement 34 that is made of metal.

The BL inner RF 32 is a member that is elongated and is made of CFRP, and is disposed with the length direction thereof being the vehicle longitudinal direction. Further, the BL inner RF 32 is joined to the surface 30A at the vehicle transverse direction inner side of the door inner panel 30. Concretely, as shown in FIG. 1, an upper side joining portion 32U and a lower side joining portion 32L of the BL inner RF 32 are respectively joined to an upper side joining portion 30U and a lower side joining portion 30L of the door inner panel 30. Due thereto, a closed cross-section structure portion 35 that extends in the vehicle longitudinal direction is formed at the upper portion of the side door 10 by the door inner panel 30 and the BL inner RF 32. Further, a rib 31 that is disposed at the interior of the closed cross-section structure portion 35 is formed at the door inner panel 30.

Further, the annular RF 22 of the door outer assembly 12 and the door inner panel 30 of the door inner assembly 14 are fastened by bolts to, of the outer edge portion of the side door 10, portions other than the beltline (the boundary portion of the door upper portion). The side door 10 that is shown in FIG. 6 is thereby structured. Further, a door trim 36 is mounted to the vehicle transverse direction inner side of the door inner panel 30 (see FIG. 1). Note that a cross-sectional view corresponding to line 1-1 in FIG. 6 is shown in FIG. 1.

[Structures of Main Portions]

Brackets 50 of (at) up-stop members 40, that are formed from the brackets 50 and up-stop main bodies 60, are respectively mounted to the front portion and the rear portion (for example, broken line portions 32T in FIG. 8) at the BL inner RF 32. The mounting structure of the up-stop member 40 is described in detail hereinafter.

Figure 2:
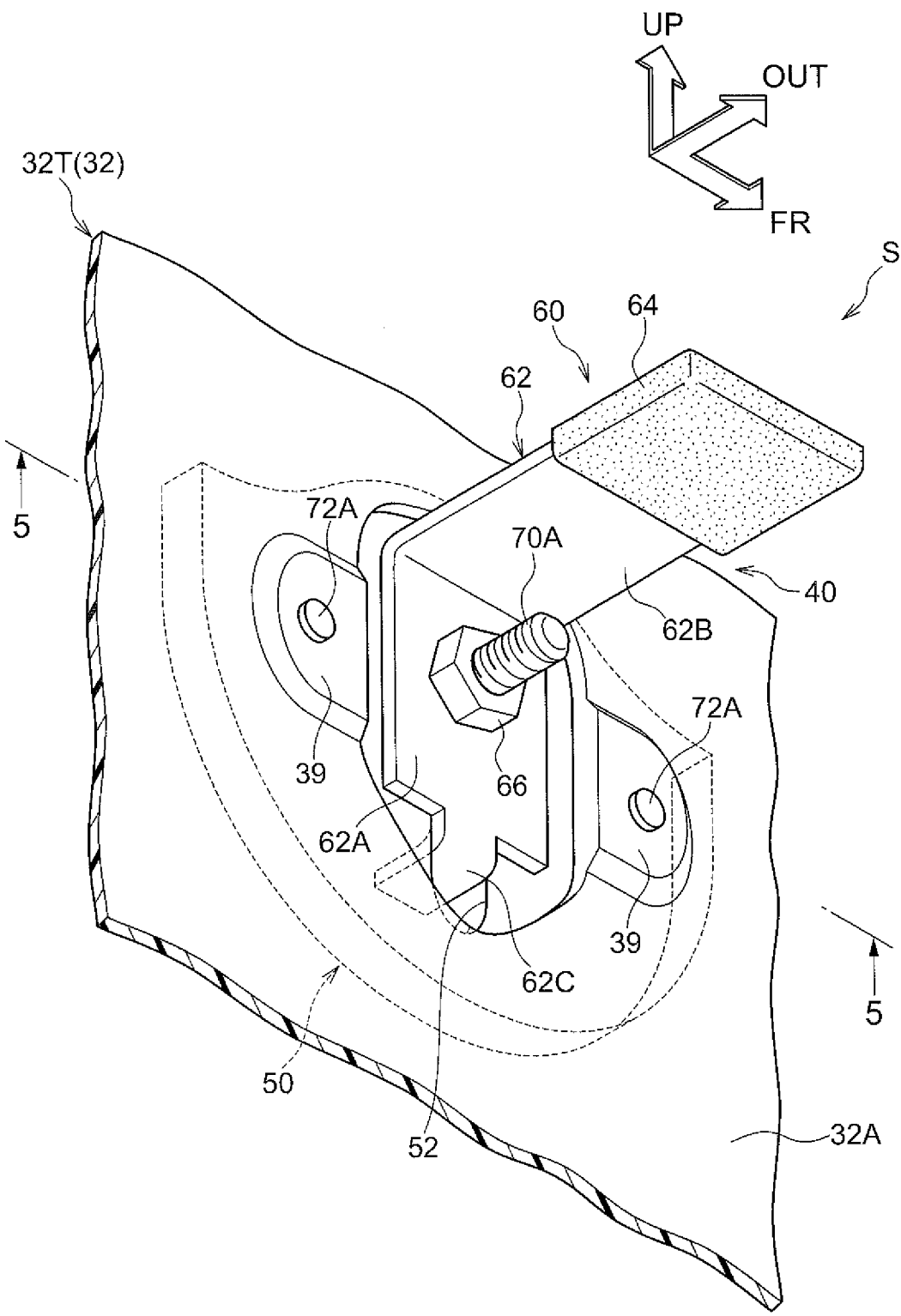
FIG. 2 is a perspective view showing, in an enlarged manner, a mounting structure of an up-stop member.
Figure 3:
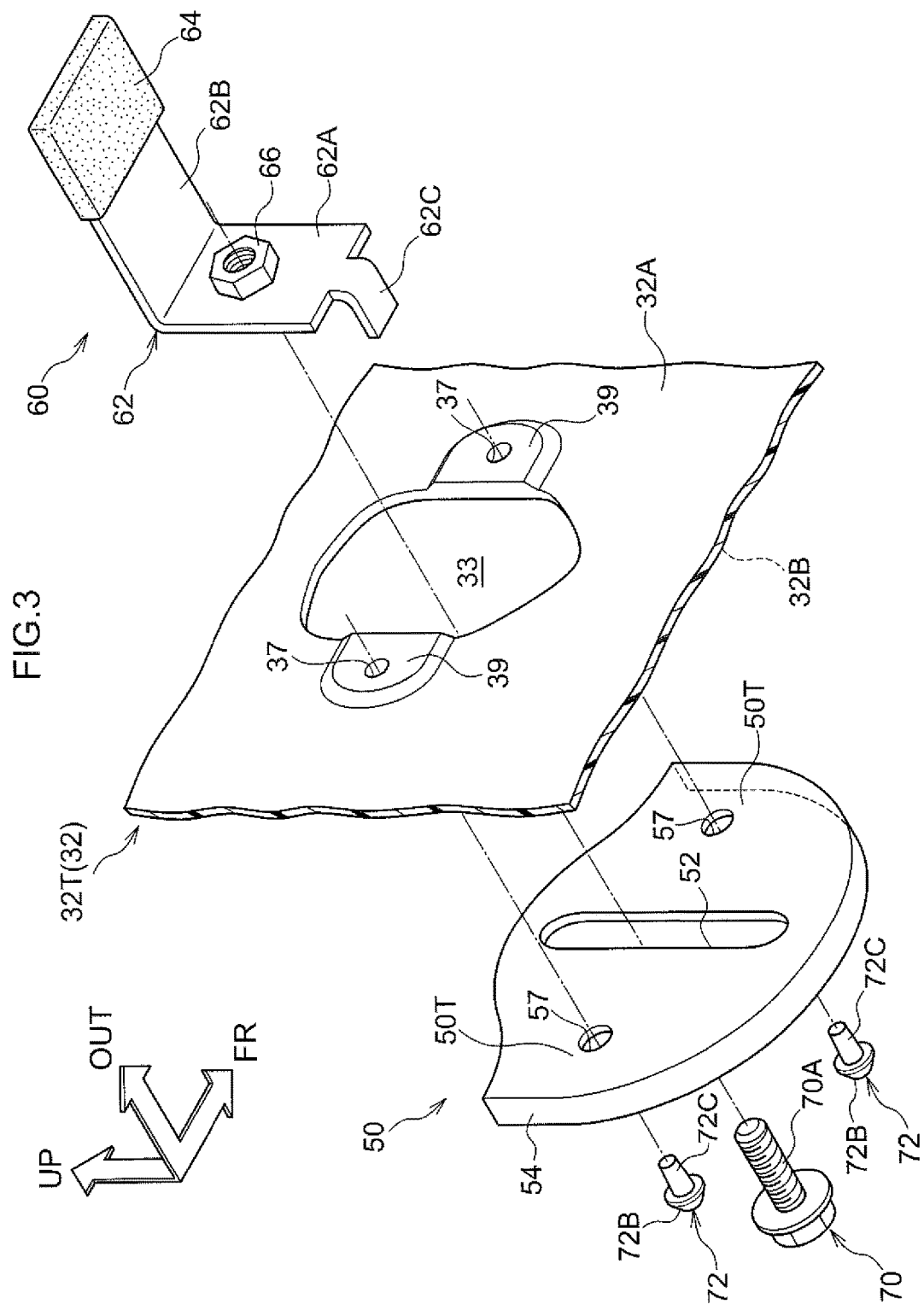
FIG. 3 is an exploded perspective view that corresponds to FIG. 2.

The mounting structure of the up-stop member 40 is shown in FIG. 2 in a perspective view seen from an obliquely lower side. Further, an exploded perspective view corresponding to FIG. 2 is shown in FIG. 3. As shown in FIG. 3, a communication hole 33, that passes-through (communicates) a surface 32A at the vehicle transverse direction outer side and a surface 32B at the vehicle transverse direction inner side of the BL inner RF 32 in the plate thickness direction, is formed in the portion (hereinafter called the "mounting portion 32T of the BL inner RF 32" or the like) of the BL inner RF 32 at which portion the up-stop member 40 (see FIG. 1) is to be mounted. The communication hole 33 is made to be a size that can accommodate a base portion 62A of the up-stop main body 60 that is described later. Further, two rivet insert-through holes 37, through which shaft portions 72C of rivets 72 are inserted, are formed at the mounting portion 32T of the BL inner RF 32 with the communication hole 33 disposed therebetween. The peripheral edges of the rivet insert-through holes 37 are made to be thick-walled portion 39 that are thicker than the other portions. The direction in which the two rivet insert-through holes 37 are lined-up (for example, the direction of connecting the two rivet insert-through holes 37) coincides with the direction orthogonal to the door glass raising/lowering direction.

Two rivet insert-through holes 57, that corresponds to the two rivet insert-through holes 37 of the mounting portion 32T of the BL inner RF 32, are formed in the bracket 50. Hereinafter, there are cases in which the peripheral edges of the rivet insert-through holes 57 are called joined portions 50T. A long hole 52, through which is inserted a shaft portion 70A of a bolt 70 for fastening to the up-stop main body 60 that is described later, is formed between the two rivet insert-through holes 57. The length direction of the long hole 52 coincides with the direction orthogonal to the direction of connecting the two rivet insert-through holes 57. Further, a flange portion 54 that is bent is formed at the outer edge portion of the bracket 50, at the substantially U-shaped portion except for at one direction (for example, the vehicle upper direction) of the outer edge portion.

Figure 4:
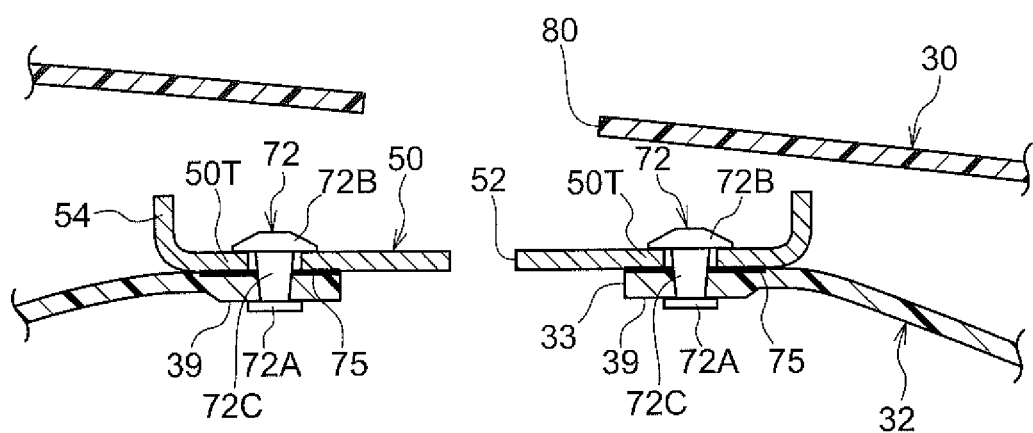
FIG. 4 is a cross-sectional view that corresponds to line 5-5 of FIG. 2, and is a drawing in which an up-stop main body is omitted.

First, the BL inner RF 32 and the brackets 50 are joined. Concretely, in a state in which the brackets 50 are superposed on the surface 32B at the vehicle transverse direction inner side of the BL inner RF 32, the rivets 72 are inserted, from the bracket 50 sides, into the rivet insert-through holes 57 of the brackets 50 and the rivet insert-through holes 37 of the BL inner RF 32, and the BL inner RF 32 side portions of the rivets 72 are crimped (for example, pressure is applied thereto). Due thereto, as shown in FIG. 4, the thick-walled portions 39 of the BL inner RF 32 and the joined portions 50T of the brackets 50 are joined by the rivets 72. Further, at this time, the joining of the brackets 50 and the BL inner RF 32 is carried out also by an adhesive, and adhesion portions 75 are formed (provided) between the brackets 50 and the BL inner RF 32. In the state in which the brackets 50 and the BL inner RF 32 are joined, the directions of the long holes 52 of the brackets 50 coincide with the door glass raising/lowering direction.

Next, the BL inner RF 32 is joined to the door inner panel 30. As shown in FIG. 4, tool insert-through holes 80, through which a tool can be inserted, are formed at the portions of the door inner panel 30, which portions face the communication holes 33 of the BL inner RF 32 in the state in which the door inner panel 30 is joined to the BL inner RF 32.

Figure 5:
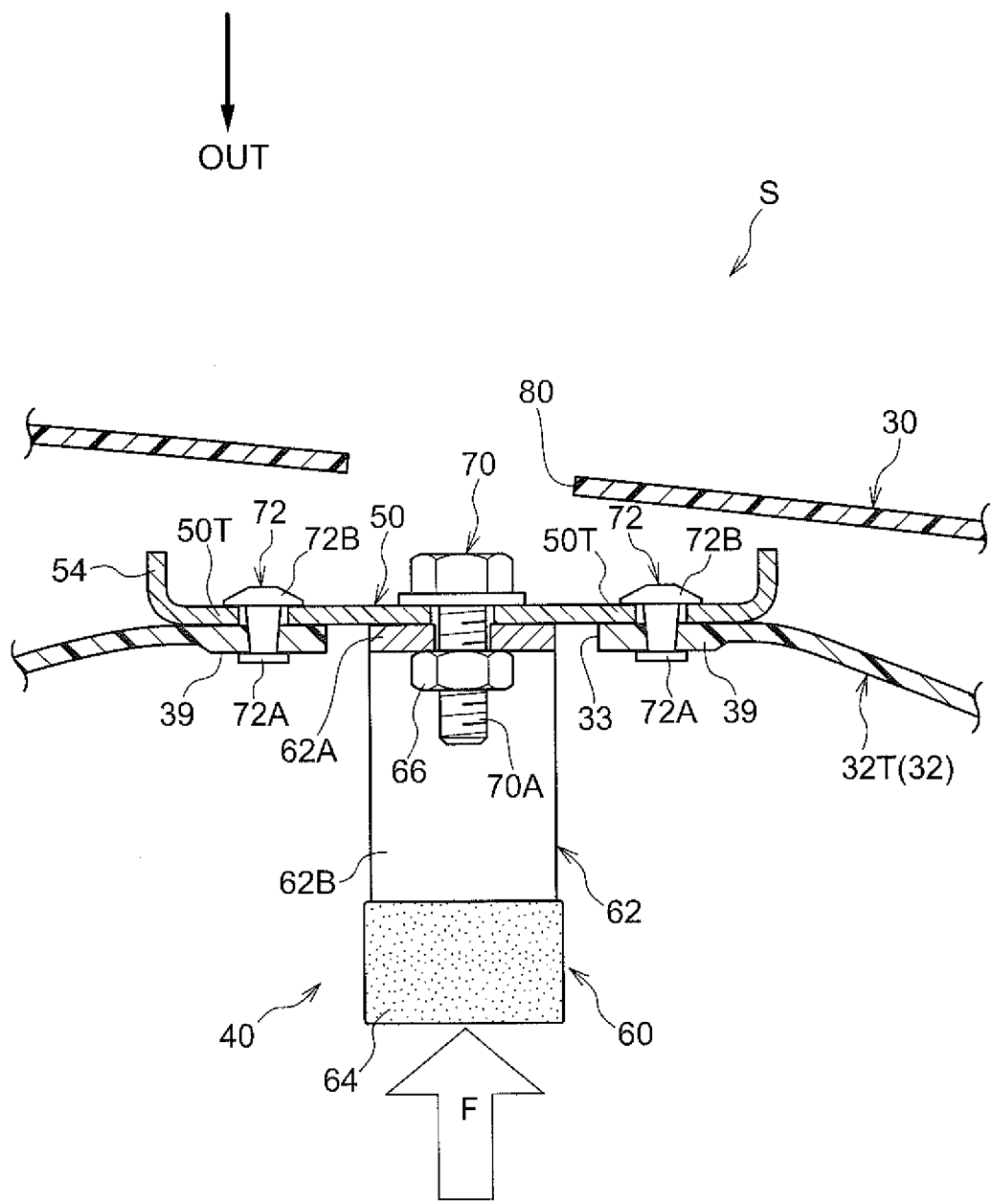
FIG. 5 is a cross-sectional view that corresponds to line 5-5 of FIG. 2.

Finally, the up-stop main bodies 60 are mounted. Concretely, the up-stop main bodies 60 are placed in the door interior from service holes of the door inner panel 30, and, as shown in FIG. 5, the up-stop main bodies 60 are fastened and fixed to the brackets 50 by using the tool insert-through holes 80 of the door inner panel 30.

As shown in FIG. 3, the up-stop main body 60 is structured to include a metal portion 62 that is formed by bending a plate member made of metal, a rubber stopper 64 that serves as an "abutment portion" that is abutted by a glass-side member 92 (see FIG. 1) that is fixed to the lower portion of the door glass 90, and a weld nut 66 that is welded to the metal portion 62. Note that, as shown in FIG. 1, the glass-side member 92 is made to be a member that is made of resin and is formed in the shape of a cylindrical tube having a bottom, and is fixed to the lower portion of the door glass 90 by a fastening member 94.

The metal portion 62 is formed by being bent in a substantial Z-shape, and is structured by the base portion 62A that contacts the bracket 50 in a state of being joined to the bracket 50, a projecting portion 62B that is bent substantially perpendicularly from the upper end of the base portion 62A, and a rotation preventing portion 62C that is bent substantially perpendicularly from the lower end of the base portion 62A in the direction opposite the projecting portion 62B. The rubber stopper 64 is mounted to the lower side of the distal end of the projecting portion 62B. In the state in which the up-stop main body 60 is fastened and fixed to the bracket 50, the projecting portion 62B projects-out further toward the vehicle transverse direction outer side than the BL inner RF 32 (see FIG. 2). Further, the rubber stopper 64 that is provided at the projecting portion 62B is disposed at a position of abutting the glass-side member 92 that is fixed to the lower portion of the door glass 90 (see FIG. 1). Namely, when the door glass 90 is raised, the glass-side member 92 abuts the rubber stopper 64. The range of raising of the door glass is thereby limited.

In the state in which the up-stop main body 60 and the bracket 50 are fastened and fixed together, the rotation preventing portion 62C is in a state of being inserted-through the long hole 52 of the bracket 50. Due thereto, the up-stop main body 60 is prevented from rotating around the bolt 70 with respect to the bracket 50. Further, although illustration thereof is omitted in drawings other than FIG. 1, the up-stop main body 60 has a rotating preventing portion 61 in addition to the above-described rotation preventing portion 62C.

<Operation/Effects>

Operation and effects of the vehicle door structure S of the FIGS. 1-8 embodiment are described next.

In the vehicle door structure S of the FIGS. 1-8 embodiment, the closed cross-section structure portion 35, whose length direction is the vehicle longitudinal direction, is formed at the upper portion of the side door 10 by the door inner panel 30 and the BL inner RF 32 that is provided at the vehicle transverse direction outer side of the door inner panel 30. The upper portion of the side door 10 is reinforced thereby. Further, the weight of the side door 10 is lightened due to the door inner panel 30 and the BL inner RF 32 being made of FRP.

Further, the vehicle door structure S of the FIGS. 1-8 embodiment has the up-stop member 40. The up-stop member 40 is structured to include the joined portions 50T that are joined to the BL inner RF 32, and the rubber stopper 64 that is disposed further toward the vehicle transverse direction outer side than the closed cross-section structure portion 35. The range of raising of the door glass 90 is limited due to the rubber stopper 64 abutting the glass-side member 92.

Moreover, the communication hole 33 that communicates the interior and the exterior of the closed cross-section structure portion 35 is formed in the BL inner RF 32. In the state in which the up-stop member 40 is inserted-through this communication hole 33, and the joined portions 50T of the up-stop member 40 are superposed on the BL inner RF 32 from the vehicle transverse direction inner side, the joined portions 50T are joined by the rivets 72.

Therefore, even in a case in which a large load F (for example, refer to arrow F of FIG. 5) that is directed toward the vehicle transverse direction inner side is inputted to the up-stop member 40 at the time of a side collision, the rivets 72 break or are damaged or the like, and the up-stop member 40 separates from the BL inner RF 32 toward the vehicle transverse direction inner side. More concretely, the load F that is inputted to the up-stop main body 60 is transmitted via the base portion 62A to the bracket 50, and the head portions (for example, crimped portions 72A) at the vehicle transverse direction outer sides of the rivets 72 that join the bracket 50 and the BL inner RF 32 deform or break or the like, and the bracket 50, together with the up-stop main body 60, separates from the BL inner RF 32 toward the vehicle transverse direction inner side. Due thereto, a concentration of stress arising at the BL inner RF 32 that is made of FRP is suppressed, and therefore, breakage of the BL inner RF 32 can be suppressed.

Further, at the vehicle door structure S of the FIGS. 1-8 embodiment, the adhesion portions 75 that join the BL inner RF 32 and the bracket 50 are disposed between the BL inner RF 32 and the bracket 50 of the up-stop member 40 (see FIG. 4). Namely, the joining of the BL inner RF 32 and the bracket 50 of the up-stop member 40 is carried out not only by fastening by the rivets 72, but also by adhesion by the adhesive. Thus, the load at which the up-stop member 40 separates can be easily adjusted by the surface area of application (for example, the surface area of placement) of the adhesive and the type of adhesive and the like, and further, penetration of sound into the vehicle cabin can be suppressed.

Further, at the vehicle door structure S of the FIGS. 1-8 embodiment, as shown in FIG. 5, the up-stop member 40 is formed from the bracket 50 that is structured to include the joined portions 50T, and the up-stop main body 60 that is structured to include the rubber stopper 64 and that is fixed to the bracket 50. Moreover, the bracket 50 and the up-stop main body 60 are structured such that the relative fixed position of the up-stop main body 60 with respect to the bracket 50 can be adjusted, due to the long hole 52 (see FIG. 3) being formed in the bracket 50 as shown in FIG. 2. Namely, the bracket 50 and the up-stop main body 60 are fixed due to the bolt 70 being fastened to the weld nut 66 in the state in which the bolt 70 is inserted-through the long hole 52 of the bracket 50. Due thereto, by adjusting the position of the bolt 70 with respect to the long hole 52 of the bracket 50, the relative fixed position of the up-stop main body 60 with respect to the bracket 50 can be adjusted. Therefore, the position of the up-stop main body 60 can be adjusted in the state in which the bracket 50 of the up-stop member 40 and the BL inner RF 32 are joined as are by the rivets 72. Further, therefore, in the manufacturing process, first, the bracket 50 can be joined to the BL inner RF 32, and, after the assembling of the side door 10 to the vehicle main body is completed, the up-stop main body 60 can be mounted to the side door 10.

Further, at the vehicle door structure S of the FIGS. 1-8 embodiment, as shown in FIG. 5, formed in the door inner panel 30 is the tool insert-through hole 80 that is a through-hole through which a tool for adjusting the relative fixed position of the up-stop main body 60, or a tool for fixing the up-stop main body 60 to the bracket 50, can be inserted. Therefore, the adjusting of the position of the up-stop main body 60 is easy. Further, after the BL inner RF 32 and the door inner panel 30 are joined, mounting of the up-stop main body 60 is easy.

Further, in the vehicle door structure S of the FIGS. 1-8 embodiment, with regard to the joining of the bracket 50 and the BL inner RF 32, the rivets 72, that are formed from head portions 72B and the shaft portions 72C and that are shown in FIG. 3, are inserted-through from the bracket 50 side and are joined due to, of the shaft portions 72C, the portions thereof, that jut-out from the BL inner RF 32, deforming. In other words, the vehicle transverse direction outer sides of the rivets 72 are joined by crimping. Due thereto, the crimped portions 72A of the rivets 72 face the vehicle transverse direction outer side. Further, as a result, the head portions that are at the vehicle transverse direction outer sides of the rivets 72 (i.e., the crimped portions 72A) have a smaller diameter than the head portions 72B that are at the vehicle transverse direction inner sides.

Supplementary Description of Above-Described Embodiment

Figure 9A:
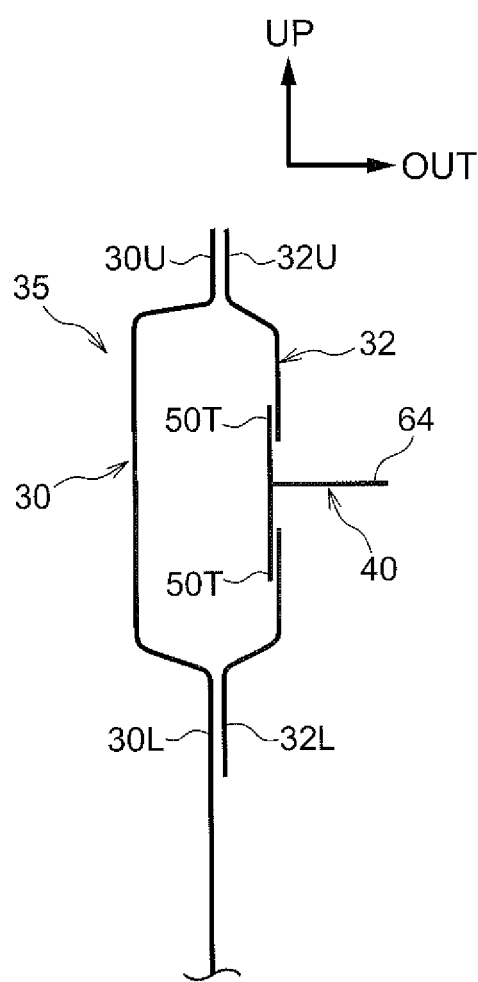
FIG. 9A is a drawing schematically showing the vehicle door structure of the present disclosure, and is a drawing showing the FIG. 1 embodiment.
Figure 9B:
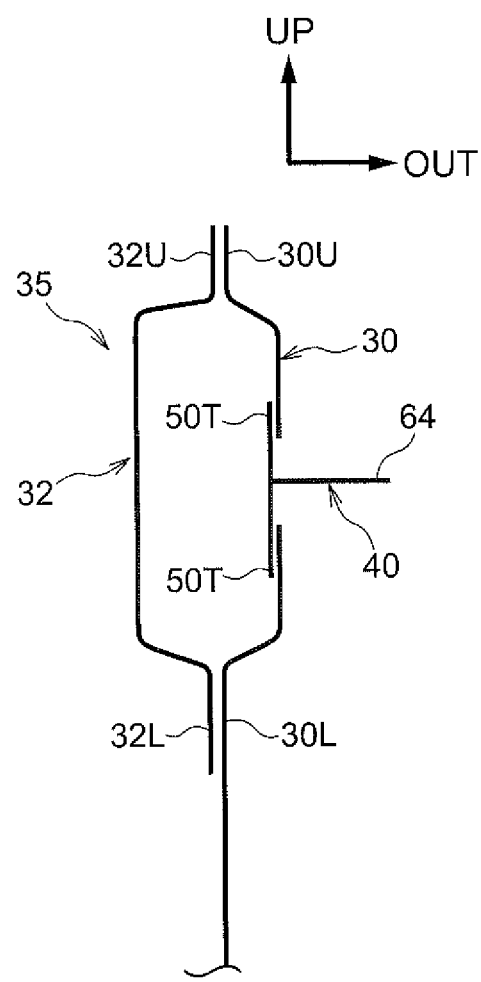
FIG. 9B is a drawing schematically showing the vehicle door structure of the present disclosure, and is a drawing showing a modified example.

Note that, in the above-described embodiment, as shown schematically in FIG. 9A, the BL inner RF 32 is joined to the vehicle transverse direction outer side of the door inner panel 30, and the closed cross-section structure portion 35 whose length direction is the vehicle longitudinal direction is formed at the vehicle door upper portion. However, the present disclosure is not limited to this. As shown in FIG. 9B, the position to which the BL inner RF 32 is joined may be at the vehicle transverse direction inner side of the door inner panel 30. In the structure shown in FIG. 9A, the door inner panel 30 corresponds to the "first panel", and the BL inner RF 32 corresponds to the "second panel". On the other hand, in the structure shown in FIG. 9B, the BL inner RF 32 corresponds to the "first panel", and the door inner panel 30 corresponds to the "second panel".

Further, in the above-described embodiment, the door inner panel 30 that corresponds to the "first panel" is made of CFRP, but the material of the first panel of the present disclosure invention is not limited to this, and may be a metal such as iron or aluminum or the like. Further, the BL inner RF 32 that corresponds to the "second panel" is made of CFRP, but the material of the second panel of the present disclosure is not limited to this, and may be, for example, a glass fiber reinforced resin (GFRP).

Further, in the above-described embodiment, the up-stop member 40 is structured from the up-stop main body 60 and the bracket 50 that is formed as a body separate from the up-stop main body 60 and that is fastened and fixed to the up-stop main body 60. However, the present disclosure is not limited to this, and the up-stop member may be such that the up-stop main body 60 and the bracket 50 are formed integrally.

The above-described embodiment illustrates, as an example, the side door 10 at which the annular RF 22 is joined to the door outer panel 20, and the door inner panel 30 is fastened and fixed to the annular RF 22. However, the present disclosure is not limited to this. The vehicle door may be a structure that does not have an annular RF, and in which the door inner panel is joined directly to the door outer panel. Further, although the regulator is a cable-type regulator in the above-described embodiment, the type of the regulator is not particularly limited.

Further, in the above-described embodiment, the joining of the bracket 50 and the BL inner RF 32 is carried out by the vehicle transverse direction outer sides of the rivets being crimped. However, the present disclosure is not limited to this, and the joining may be carried out by the vehicle transverse direction inner sides being crimped. Moreover, the type of "rivets" in the present disclosure is not particularly limited. For example, the rivets may be blind rivets, or may be self-piercing rivets.

The disclosure of Japanese Patent Application No. 2015-249004 that was filed on Dec. 21, 2015 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A sashless vehicle door structure configured to separate an interior of a vehicle on an inner side of the sashless vehicle door structure from an exterior of a vehicle on an outer side of the sashless vehicle door structure, the sashless vehicle door structure comprising:
    a first panel having an outer side configured to face the exterior of the vehicle;
    a second panel made of a fiber reinforced resin and provided on the outer side of the first panel, the second panel forming a closed cross-section structure portion with the first panel at an upper portion of a vehicle door, the closed cross-section structure portion having a length direction that extends in a vehicle longitudinal direction;
    an up-stop member that includes joined portions joined to the second panel, a base portion, and an abutment portion non-rotatably fixed on a first side of the base portion, the abutment portion being positioned on an outer side of the closed cross-section structure portion configured to face the exterior of the vehicle, the abutment portion limiting a range of a door glass by abutting a glass-side member provided at a lower portion of the door glass when the door glass is fully raised, the joined portions being joined in a state of being superposed on an inner side of the second panel configured to face the interior of the vehicle;
    rivets that join the second panel and the joined portions;
    a door outer panel disposed on the outer side of the first panel; and
    a communication hole formed in the second panel, the communication hole communicating an interior and an exterior of the closed cross-section structure portion, the base portion of the up-stop member being positioned within a perimeter of the communication hole such that the entirety of the base portion is accommodated by the communication hole.

2. The sashless vehicle door structure of claim 1, further comprising adhesion portions that join the second panel and the up-stop member, the adhesion portions being provided between the second panel and the up-stop member.

3. The sashless vehicle door structure of claim 1, wherein:
    the up-stop member is fixed to a bracket structured to include the joined portions, and
    the bracket and the up-stop member are structured such that a relative fixed position of the up-stop member with respect to the bracket can be adjusted.

4. The sashless vehicle door structure of claim 3, further comprising a through-hole formed in the first panel, wherein a tool for adjusting the relative fixed position of the up-stop member can be inserted through the through-hole.

5. The sashless vehicle door structure of claim 3, further comprising an elongated hole disposed along a movement direction of the door glass, the elongated hole being provided in the bracket, the bracket and the up-stop member being fastened and fixed together by a bolt extending through the elongated hole.

6. The sashless vehicle door structure of claim 1, wherein each rivet includes:
    a shaft portion that is inserted through the second panel a corresponding joined portion of the joined portions;
    a head portion that is disposed at one end side of the shaft portion, and
    a crimped portion at which another end side of the shaft portion is crimped.

7. A method of manufacturing a vehicle door that includes the sashless vehicle door structure of claim 1, wherein the rivets that join the second panel and the joined portions are crimped on a side facing the outer side of the sashless vehicle door structure.

8. The sashless vehicle door structure of claim 1, further comprising a rib disposed in the interior of the closed cross-section structure portion.

* * * * *